United States Patent [19]

Vagias

[11] Patent Number: 4,852,948
[45] Date of Patent: Aug. 1, 1989

[54] TRACTION DEVICE

[76] Inventor: Ernest Vagias, 265 Prospect St., Baden, Pa. 15005

[21] Appl. No.: 588,499

[22] Filed: Mar. 12, 1984

[51] Int. Cl.$^4$ .............................................. B60B 15/00
[52] U.S. Cl. ............................... 301/44 T; 301/41 R; 152/225 C; 152/216
[58] Field of Search ................ 301/41 R, 44 R, 44 T, 301/43, 47, 46; 152/213 R, 216, 217, 218, 221-222, 225 R, 225 C, 231-235, 238, 227; 24/69 WT, 514, 569

[56] References Cited

U.S. PATENT DOCUMENTS

| 1,065,064 | 6/1913 | MacDonell | 301/44 T |
| 1,088,314 | 2/1914 | Wilcke | 24/514 X |
| 1,540,470 | 6/1925 | Hayden | 152/216 |
| 1,763,128 | 6/1930 | Bolland | 24/569 |
| 2,510,596 | 6/1950 | Murphy | 24/569 X |
| 2,524,973 | 10/1950 | Hammond et al. | 152/225 C |
| 2,598,851 | 6/1952 | Spevak | 301/43 |
| 2,873,783 | 2/1959 | O'Higgins | 152/225 R |
| 3,130,767 | 4/1964 | Davis | 301/43 |
| 3,368,251 | 2/1968 | Williams | 24/569 X |
| 3,861,752 | 1/1975 | Thurre et al. | 301/44 T |
| 4,409,432 | 10/1983 | Willem et al. | 24/569 X |

FOREIGN PATENT DOCUMENTS 121154 3/1918 United Kingdom ............ 301/44 R

Primary Examiner—Russell D. Stormer
Attorney, Agent, or Firm—Clifford A. Poff

[57] ABSTRACT

A traction device designed for attachment and support by a spoke of a vehicle wheel. The traction device includes a clamping arm that is forced by a threaded fastener to grip an individual spoke. Extending from the clamping arm is a traction arm having a traction finger that extends transversely to the treadwall portion of the tire.

1 Claim, 1 Drawing Sheet

TRACTION DEVICE

BACKGROUND OF THE INVENTION

This invention relates to an anti-skid or traction-aid device for a vehicle wheel assembly, and more particularly to such a device for use with a pneumatic tire of an automobile or the like while mounted on a wheel rim having multiple radially-extending spokes to which the device is removably attached.

The traction device of the present invention is designed for rapid and convenient installation and removal from the vehicle tire while in contact with the surface of a road.

Two useful alternatives to the common practice of employing metallic chains to envelop the tread portion of a vehicle tire are disclosed in my U.S. Pat. Nos. 3,893,497 and 4,278,122. In U.S. Pat. No. 3,893,497, there is disclosed an anti-skid apparatus made from a tire casing from which a radial segment is removed so that the casing can be placed over the tire of a vehicle while in contact with the road surface. A fastener is used to interconnect the end portions of the tire casing. In U.S. Pat. No. 4,278,122, there is disclosed a traction device for a vehicle wheel assembly having spoke hole openings in the wheel rim thereof which engage with support arms extending to a carrier plate at the hub portion of the wheel assembly. Traction arms are attached to the carrier plate to extend across the treadwall portion of the tire. A threaded shaft extends from the carrier plate to the axle member of the vehicle for engaging the support arms with the wheel rim.

In other forms of anti-skid apparatus, an anti-skid arm is made from a narrow band or strap with a plurality of such arms arranged at spaced-apart locations about a surface of the tire. The manner by which the arms are supported is very important and greatly affects the successful use of the device. One general concept for supporting the anti-skid arms is to mount them onto a plate that is attached by the wheel lug nuts to the wheel studs for the vehicle wheel. Examples of such a support plate are disclosed in U.S. Pat. Nos. 2,397,277; 3,426,824; 3,753,456; 3,996,984; 4,089,369 and 4,089,359. The attachment of a support plate in this manner requires modification to the wheel assembly and/or longer wheel studs to accommodate the support plate which should be removed when not needed. Other forms of support for the anti-skid arms are designed to movably position the arms into supported relation with the tire surface by radially displacing the arms. Examples of such forms are shown in U.S. Pat. Nos. 2,601,882; 3,016,079 and 4,122,881. These forms of support are believed less than completely adequate to accommodate the loads and forces that are imposed on the anti-skid apparatus during use and generally require an operating mechanism that protrudes from the exposed side of the vehicle wheel.

The traction device of the present invention is particularly adapted to a wheel rim of a vehicle wheel assembly having elongated and slender spoke sections formed by openings in the wheel rim between the usual hub portion and a rim portion engaged with a tire. The slender spoke sections are advantageously utilized to form support sites for traction devices that can be attached and removed without modifications and cumbersome inconveniences.

SUMMARY OF THE INVENTION

It is an object of the present invention to provide an improved traction device for a vehicle wheel assembly wherein the device is clamped directly to radial spoke portions of the wheel without modification in a simple and expedient manner.

It is a further object of the present invention to provide an improved clamping structure for attaching a traction device to the wheel rim of a wheel assembly for a vehicle without lifting the assembly from a road surface.

More particularly, according to the present invention there is provided a traction device for a vehicle wheel assembly which includes a tire with a treadwall portion supported by a rim having a plurality of spokes extending radially from a hub portion, the traction device including a traction arm having a traction finger protruding angularly from a base, the traction finger having a length sufficient to extend across at least part of the treadwall portion of the tire, clamp means carried by the base at a front surface of one of the spokes for engaging a back surface thereof, the clamp means including reversely-bent end portions at opposite radial sides of one of the spokes, and fasteners means for releasably securing the clamping means to one of the spokes.

In one embodiment, the clamping means comprising two clamp members are drawn into engagement with opposite side edges of a spoke to securely grip the spoke. For this purpose, the aforesaid fastener means takes the form of a threaded shaft having left- and right-hand threads to engage correspondingly threaded openings on the clamp member. However, in another embodiment, the fastener means takes the form of a shaft having threaded end portions to engage with a threaded opening in one of the clamp members. In this arrangement of parts, a retainer is used to rotatably attach the other end of the shaft to the other clamp member.

In a further embodiment, the clamp means takes the form of a U-shaped clamp member having reversely-bent ends which wrap around the edges of the spoke. A threaded fastener is engaged with a threaded opening in the U-shaped clamp member and forced to abut against the outer face of a spoke and thereby forcibly draw the end parts of the clamp member against the track surface of a spoke. The parts of the traction device can readily be made from steel, plastic or any suitable material but preferably plastic. It is desirable that the traction finger extends only a third of the way across the treadwall of the tire. This will allow for a significant reduction in wear and tear on the roads when such devices are used.

These features and advantages of the present invention as well as others will be more fully understood when the following description is read in light of the accompanying drawings, in which.

Figure 1:
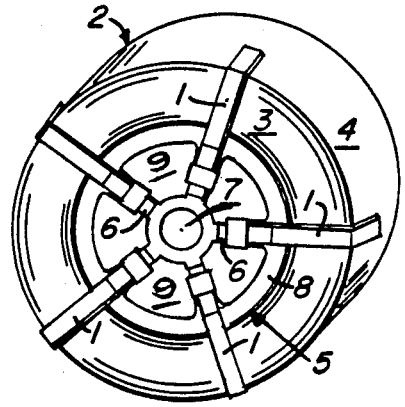
FIG. 1 is an isometric elevational view of a wheel assembly with a traction device mounted thereon according to the present invention.

According to the present invention, in FIG. 1 there is illustrated a plurality of traction devices 1 affixed to a vehicle wheel assembly which includes a tire 2 having the usual side wall portions 3 and a treadwall portion 4. The side wall portions 3 include a bead for support in the usual manner by a wheel rim 5. The wheel rim is characterized by a plurality of slender, radially-extending spoke sections 6 interconnecting a hub section 7 with rim flanges 8. The spoke sections 6 have holes to receive threaded end portions of the usual wheel studs to engage with lug nuts for holding the wheel assembly on the chassis axle. As illustrated in FIG. 1, each spoke 6 has a width of at least about 1 inch between side edges extending along window openings 9 which have, typically, a rectangular or keystone-shaped configuration. The hub section 7 also includes a central opening which fits over the projected end of the vehicle wheel axle.

Figure 2:
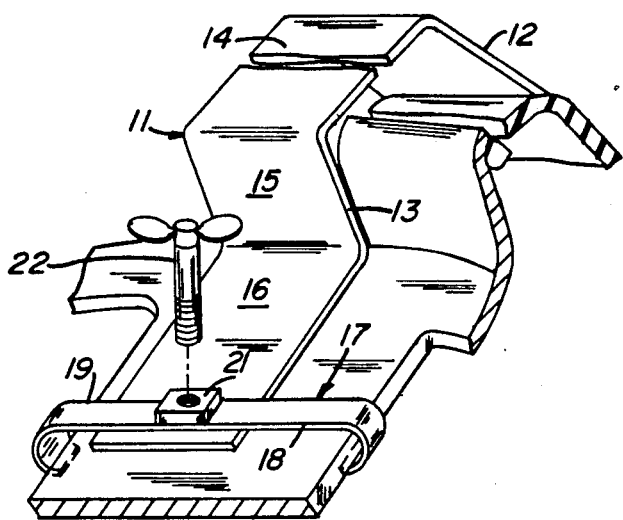
FIG. 2 is an enlarged partial side view of one embodiment of the traction device according to the present invention.

In FIG. 2, there is illustrated a first embodiment of the traction device according to the present invention which includes a traction arm 11 having an end portion forming a traction finger 12 protruding angularly from a base portion 13. The traction finger extends across a portion of the thread of the tire. The traction arm has a cross-sectional profile which generally corresponds to the profile, in cross section, of the spoked area of the wheel rim, the outwardly-extending flange therefrom which receives and supports the bead of the tire and the side wall of the tire. As can be seen from FIG. 2, the traction arm has a U-shaped configuration at its upper end comprised of the traction finger 12, a base spacer section 14 and a radial base section 15. Extending at a generally right-angle relation to section 15 is a base support arm 16 having a width that is equal to but preferably less than the width of a spoke 6. At the terminal end portions of section 16, there is attached a clamp assembly 17 having arms 18 and 19 extending from opposite sides of the traction arm. The arms 18 and 19 have reversely-curved end portions that can wrap around the opposite longitudinal sides of the spoke 6. A block, such as a nut member 21 is affixed to the exposed face surface of the arms 18 and 19 which are also affixed to the section 16. A tapped hole is provided in the nut member 21 to receive the threaded end portion of a fastener 22. The threads of the fastener are engaged with the threaded opening in member 21 and extend through an opening in the member 16 for engaging the front face surface of the spoke 6. Sufficient torque is applied to the fastener such that the traction arm is drawn away from the front face of the spoke and the reversely-extending end portions of arms 18 and 19 engage with the back surface of the spoke. Sufficient torque is applied to the fastener to firmly clamp the traction arm to the spoke.

Figure 3:
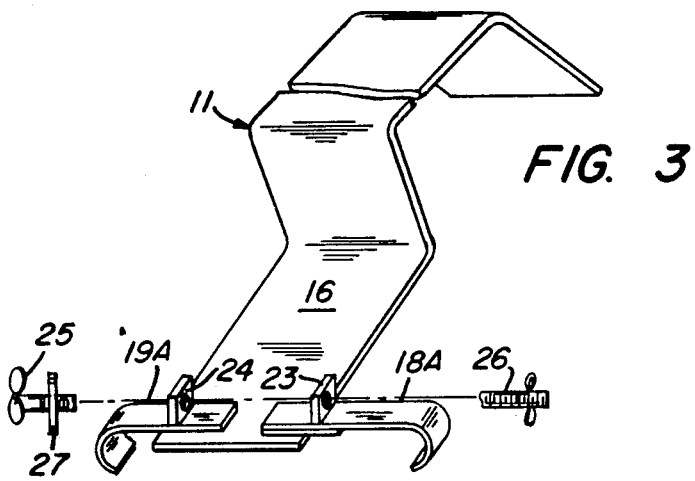
FIG. 3 is an enlarged isometric view of a second embodiment of a traction device according to the present invention.

FIG. 3 illustrates a further embodiment of the present invention in which the traction arm 11 is constructed in essentially the same manner as described previously. Attached to the lower end portion of section 16 is a separate arm 18A while an arm 19A is arranged to slide toward and away from arm 18A. Arms 18A and 19A each includes upstanding blocks 23 and 24, respectively. Block 24 has a bored opening to receive threads along a shank part 26 of a fastener 25. Block 23 has a threaded opening to engage with the threads on the end portion of fastener 25. Adjacent block 23 on an end portion of the fastener, as shown schematically in FIG. 3, there are radially-extending arms for applying torque to the fastener. A collar 27 adjacent the arms can jam against block 23. By rotating the fastener 25, the collar is drawn against block 23 and thereafter, continued rotation of the fastener draws arm 19A toward arm 18A. In this way, the reversely-bent end portions of the arms 18A and 19A are drawn into clamped engagement with opposite vertical sides of the spokes 6 for clamping the traction arm thereto.

Figure 4:
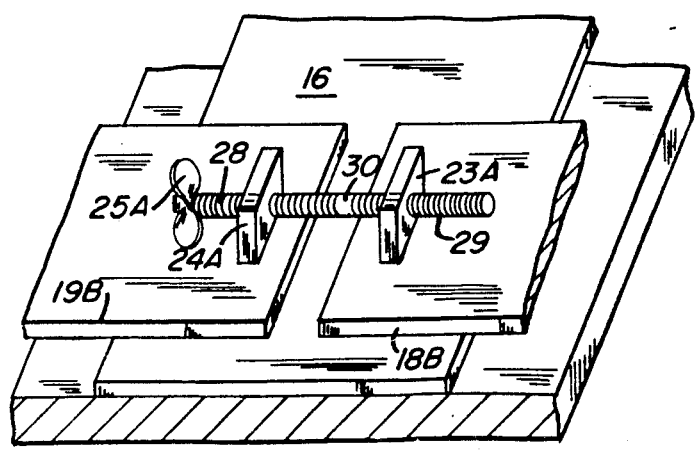
FIG. 4 is an enlarged isometric view of a third embodiment of a traction device according to the present invention.

A further embodiment of the present invention is shown in FIG. 4 which differs from the embodiment described above and shown in FIG. 3 by the provision that a threaded fastener 25A has left-hand and right-hand threaded portions 28 and 29 extending to a central body 30. Threaded portion 28 is threadedly engaged with the threads of a block 24A that is attached to clamp arm 19B. Threaded portion 29 is threadedly engaged with a tapped hole in block 23A that is affixed to the arm 18B. By rotating the fastener 25A in one direction, arm sections 18B and 19B are drawn toward each other such the reversely-bent end portions, not shown, can be drawn into clamped engagement with opposite vertical side edges of the spoke 6. By rotating the fastener in the opposite direction, the arms are forced away from the side edges of the spokes.

The ground contact surface of the traction finger preferably includes studs, cleats, knobs or the like to increase frictional contact with the ground surface for increased traction. The entire traction device can be made of steel or any suitable material, but plastic is preferred. Another important feature is that the traction arms 11 is designed to extend only one-third of the way across the treadwall portion 4 of the tire. This will significantly reduce the wear and tear such devices cause on the roadways while it will not hinder the effectiveness of this invention.

Although the ivne;ntion has been shown in connection with certain specific embodiments, it will be readily apparent to those skilled in the art that various changes in form and arrangement of parts may be made to suit requirements without departing from the spirit and scope of the invention.

I claim as my invention:

1. A traction device for vehicle wheel assembly which includes a tire with a treadwall portion supported by a rim having a plurality of spokes extending radially from a hub portion, said traction device including a traction arm having a traction finger protruding angularly from a base, said traction finger having a length sufficient to extend across at least part of the treadwall portions of said tire, clamp means including arms extending from opposite sides of said base, said arms having reversely-curved end portions terminating each of opposite radial sides of one of said spokes, and a shaft including a threaded portion receiving a nut member which is affixed to at least one of said arms for drawing the curved end portion of the arms into clamping engagement with opposite sides of one of said spokes, wherein said nut member is attached to said arms such that said shaft engages the nut member to present a protruding end portion to engage with at least one of said spokes.

* * * * *